United States Patent [19]

Hall

[11] Patent Number: 4,530,984
[45] Date of Patent: Jul. 23, 1985

[54] PROCESS FOR PRODUCTION OF POLYMERS HAVING INCREASED 1,2-MICROSTRUCTURE

[75] Inventor: James E. Hall, Akron, Ohio

[73] Assignee: The Firestone Tire & Rubber Company, Akron, Ohio

[21] Appl. No.: 595,853

[22] Filed: Apr. 2, 1984

Related U.S. Application Data

[62] Division of Ser. No. 394,068, Jul. 1, 1982, Pat. No. 4,473,661.

[51] Int. Cl.$^3$ ............................................. C08F 4/48
[52] U.S. Cl. ................................. 526/177; 526/173; 526/179; 526/180
[58] Field of Search .................. 526/177, 179, 173

[56] References Cited

U.S. PATENT DOCUMENTS

| | | | |
|---|---|---|---|
| 3,207,742 | 9/1965 | Van de Castle | 526/179 |
| 3,699,055 | 10/1972 | Trepka | 502/155 |
| 3,822,219 | 7/1974 | Kamienski et al. | 502/153 |
| 3,847,883 | 7/1974 | Kamienski et al. | 526/173 |
| 4,139,490 | 2/1979 | Halasa et al. | 502/154 |
| 4,250,283 | 2/1981 | Caunt et al. | 526/77 |

FOREIGN PATENT DOCUMENTS 1210190  2/1966  Fed. Rep. of Germany ...... 526/179

*Primary Examiner*—Christopher A. Henderson
*Attorney, Agent, or Firm*—Frank J. Troy, Sr.

[57] ABSTRACT

A process and catalyst system is disclosed herein for the preparation of (co)polymers having a 1,2-microstructure ranging between about 20 and about 65 percent. These (co)polymers are prepared in a hydrocarbon or non-polar solvent from a monomer system which contains at least one 1,3-diene monomer and optionally other copolymerizable monomers. The catalyst system which is employed in the production of the (co)polymer is a combination of (1) an anionic initiator based on lithium; (2) a dialkyl magnesium compound or a trialkyl aluminum compound or a mixture thereof; and (3) a phosphine oxide modifier which is substituted with three saturated heterocyclic rings, each hetero ring containing one nitrogen atom and either four, five or six carbon atoms.

17 Claims, No Drawings

PROCESS FOR PRODUCTION OF POLYMERS HAVING INCREASED 1,2-MICROSTRUCTURE

This application is a divisional of application Ser. No. 394,068, filed July 1, 1982, now U.S. Pat. No. 4,473,661.

BACKGROUND OF THE INVENTION

It has previously been disclosed in U.S. Pat. No. 3,207,742, to Van de Castle, that hexamethylphosphoramide (HMPA) can be used in combination with lithium hydrocarbon catalysts to produce polymers from 1,3-dienes having an increased 1,2-microstructure. However, HMPA is a suspected carcinogenic and is therefore no longer desirable to be used in catalyst systems.

In a copending application to the same assignee, filed the same day as this application, by J. E. Hall and D. N. Schulz, there is disclosed a catalyst system employing substituted phosphoramide compounds for increasing 1,2-microstructure in polymers prepared from 1,3-dienes which are not suspected carcinogenic agents and reduce the rate of side reactions which occur during polymerization, thus adding stability to the polymerization reaction. The instant invention modifies the catalyst system of the copending application in order to increase the conversion of monomer to polymer and to produce a (co)polymer having an increased 1,2-microstructure in the 1,3-diene monomer contributed units.

SUMMARY OF THE INVENTION

A process and catalyst system is disclosed herein for the preparation of (co)polymers having a 1,2-microstructure ranging between about twenty (20) and about sixty-five (65) percent in the 1,3-diene monomer contributed units. These (co)polymers are prepared in an inert non-polar solvent such as a hydrocarbon solvent from a monomer system which contains at least one 1,3-diene monomer. The catalyst system which is employed in the production of the (co)polymer is a combination of (1) an anionic initiator based on lithium; (2) an alkyl magnesium compound or an alkyl aluminum compound or a mixture thereof; and (3) a phosphine oxide modifier which is substituted with three saturated heterocyclic rings, each hetero ring containing one nitrogen atom and either four, five or six carbon atoms.

DETAILED DESCRIPTION OF THE INVENTION

The polymerization process of the present invention is for the use of a novel catalyst system for the preparation of a (co)polymer utilizing at least one 1,3-diene monomer. This novel catalyst system produces a (co)polymer which contains a 1,2-microstructure ranging between about twenty (20) and about sixty-five (65) percent in the 1,3-diene monomer contributed units.

The polymerization catalyst system which is used in the present invention is a combination of (1) an anionic initiator based on lithium; (2) an alkyl magnesium compound or an alkyl aluminum compound or mixtures thereof; and (3) a phosphine oxide modifier which is tri-substituted with saturated heterocyclic rings containing one nitrogen atom and between four and six carbon atoms, inclusive.

Monomer System

The catalyst system of the present invention is used in preparing polymers having an increased vinyl content. Polymerizable 1,3-diene monomers which can be employed in the production of the polymers of the present invention are one or more 1,3-conjugated dienes containing from four to 12, inclusive, carbon atoms per molecule. Examples thereof include the following: 1,3-butadiene; isoprene; 2,3-dimethyl-1,3-butadiene; 1,3-pentadiene (piperylene); 2-methyl-3-ethyl-1,3-butadiene; 3-methyl-1,3-pentadiene; 1,3-hexadiene; 2-methyl-1,3-hexadiene; 3-butyl-1,3-octadiene, and the like. Among the dialkyl-1,3-butadienes, it is preferred that the alkyl groups contain from one to three carbon atoms. Numerous others are disclosed, for instance, in U.S. Pat. No. 3,377,404, the disclosure with respect to which is incorporated herein by reference. The preferred 1,3-diene monomer for use in the present invention is butadiene.

Although butadiene homopolymers or homopolymers prepared from other 1,3-diene monomers are preferred in the practice of this invention, copolymers containing at least one 1,3-diene monomer can be prepared when the comonomers impart desirable properties and do not detract from the polymeric properties. Comonomers of different 1,3-diene monomers can be combined in any proportion. When a comonomer system employs a copolymerizable monomer other than a 1,3-diene monomer(s), generally at least one percent, preferably at least five percent by weight of the non-1,3-diene monomer(s) should be used and as much as sixty percent, preferably no more than forty percent of the non-1,3-diene monomer(s) may be used. The term (co)polymer is defined herein as either a homopolymer or a copolymer formed from at least one diene monomer and optionally one or more copolymerizable monomers.

Suitable comonomers which can be employed in producing the copolymers of the present invention include one or more polymerizable vinyl-substituted aromatic monomers. Examples of suitable vinyl-substituted aromatic monomers for use in the present invention include styrene; alpha-methylstyrene; 1-vinylnaphthalene; 2-vinylnaphthalene; 1-alphamethylvinylnaphthalene; 2-alphamethylvinylnaphthalene; 1,2-diphenyl-4-methylhexene-1; 1,6-diphenyl-hexadiene-1,5; 1,3-divinylbenzene; 1,3,5-trivinylbenzene; 1,3,5-triisopropenylbenzene; 1,4-divinylbenzene; 1,3-distyrylbenzene; 1,4-distyrylbenzene; 1,2-distyrylbenzene; and mixtures of these, as well as alkyl, cycloalkyl, aryl alkaryl and aralkyl derivatives thereof in which the total number of carbon atoms in the combined hydrocarbon constitutes generally not greater than 12. Examples of these latter compounds include: 3-methylstyrene; 3,5-diethylstyrene; 2-ethyl-4-benzylstyrene; 4-phenylstyrene; 4-p-tolylstyrene; 2,4-divinyltoluene; 4,5-dimethyl-1-vinylnaphthalene; 2,4,6-trivinyltoluene; and 2,4,6-triisopropenyltoluene. Again, reference is made to U.S. Pat. No. 3,377,404 for disclosures of additional vinyl-substituted aromatic compounds which are incorporated herein by reference.

The solvent polymerization takes place in inert organic diluents, in which the monomer, anionic initiator and phosphine oxide modifier are soluble. Many suitable inert diluents are known in the art and those diluents generally preferred are alkanes, or other non-polar solvents. Suitable diluents include but are not limited to ethane, propane, iso- and n-butane, iso- and n-pentane, iso- and n-hexane, iso-and n-heptane, iso- and n-octane, cyclobutane, cyclopentane, cyclohexane, cycloheptane, cyclooctane; benzene and toluene. Preferred diluents are iso- and n-butane, iso- and n-pentane, iso- and n-hexane, iso- and n-heptane. The diluents can be employed either alone or in admixture, e.g., as a hydrocarbon distillate fraction. The concentration of monomer in solvent can range from 2 to 50 wt. percent or more and is generally dependent upon economics and the ability to control reaction conditions and to handle the polymer solution. The use of a monomer concentration ranging from 15 to 25 wt. percent is generally practical.

Catalyst System

The anionic initiators based on lithium can be selected from any of the known organolithium compounds which are known in the art as being useful in the polymerization of 1,3-diene monomers. Suitable organolithium catalysts include substituted lithium amines and substituted lithium phosphines as well as catalysts having the formula ROLi or R(Li)$_x$, wherein R represents a hydrocarbyl radical of 1 to 20, preferably 2-8, carbon atoms per R group, and x is an integer of 1-4. Typical R groups include aliphatic radicals and cycloaliphatic radicals, such as alkyl, cycloalkyl, cycloalkylalkyl, alkylcycloalkyl, aryl and alkylaryl radicals.

Specific examples of R groups for substitution in the above formulas include primary, secondary and tertiary groups such as methyl, ethyl, n-propyl, isopropyl, n-butyl, isobutyl, t-butyl, n-amyl, isoamyl, n-hexyl, n-octyl, n-decyl, cyclopentyl-methyl, cyclohexyl-ethyl, cyclopentyl-ethyl, methyl-cyclopentylethyl, cyclopentyl, cyclohexyl, 2,2,1-bicycloheptyl, methylcyclopentyl, dimethylcyclopentyl, ethylcyclopentyl, methylcyclohexyl, dimethylcyclohexyl, ethylcyclohexyl, isopropylcyclohexyl, and the like.

Specific examples of other suitable lithium catalysts include:

phenyllithium, naphthyllithium, 4-butylphenyllithium, p-tolyllithium, 4-phenylbutyllithium, 4-butylcyclohexyllithium, 4-cyclohexylbutyllithium, 1,4-dilithiobutane, 1,10-dilithiodecane, 1,20-dilithioeicosane, 1,4-dilithiobenzene, 1,4-dilithionaphthalene, 9,10-dilithioanthracene, 1,2-dilithio-1,2-diphenylethane, 1,3,5-trilithiopentane, 1,5,15-trilithioneicosane, 1,3,5-trilithiocyclohexane, 1,3,5,8-tetralithiodecane, 1,5,10,20-tetralithiooeicosane, 1,2,4,6-tetralithiocyclohexane, 4,4'-dilithiobiphenyl, and the like.

Other lithium catalysts which can be employed are lithium dialkyl amines, lithium dialkyl phosphines, lithium alkyl aryl phosphines and lithium diaryl phosphines.

Mixtures of different lithium catalysts can also be employed. The preferred lithium catalysts for use in the present invention are n-butyllithium and lithium alkoxides such as lithium-t-butoxide.

The dialkyl magnesium compounds which are useful as catalysts in the present invention contain alkyl groups substituted on the magnesium which contain from one to ten carbon atoms. Suitable dialkyl magnesium catalysts include dimethyl magnesium, diethyl magnesium, dipropyl magnesium, di(n,s,t-)butyl magnesium, and the like. The preferred dialkyl magnesium catalyst for use in the present invention is (n-butyl, s-butyl) magnesium or di-n-butyl magnesium.

The trialkyl aluminum compounds which are useful as catalysts in the present invention contain from one to eight carbon atoms in each alkyl group. Examples of suitable trialkyl aluminum catalysts include trimethyl aluminum, triethyl aluminum, tri(iso-or n-)propyl aluminum, tri(n,s,t)butyl aluminum, and the like. The preferred trialkyl aluminum catalyst for use in the present invention is triethyl aluminum.

The substituted phosphine oxide modifiers which can be employed in the present invention are represented by formula (I):

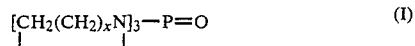

wherein x represents an integer of 3, 4 or 5.

Specific examples of substituted phosphine oxide catalysts which can be employed in the present invention include most preferably, tripiperidine phosphine oxide, as well as tripyrrolidine phosphine oxide and tri(cyclohexamethylene amine) phosphine oxide. Mixtures of these phosphine oxides can also be employed.

While the anionic initiator, the dialkyl magnesium compound and/or the trialkyl aluminum compound and the phosphine modifier can be added as a mixture to the monomer system, it is preferred that they be added sequentially with the addition of the anionic initiator as well as the dialkyl magnesium and/or the trialkyl aluminum compounds being added to the monomer system following the addition of the phosphine oxide modifier.

As previously indicated either a dialkyl magnesium compound or a trialkyl aluminum compound or a combination of both compounds can be employed in the catalyst system of the present invention. For the most effective results, the (magnesium+aluminum)/lithium metal mole ratio, hereinafter referred to as (Mg+Al)/Li ratio, is generally in the range of 0.01/1 to 100/1, preferably in the range of 0.2/1 to 5/1 and the concentration of the total of the dialkyl magnesium compound and the trialkyl aluminum compound is generally in the range of 0.1-100 millimoles (mM) per hundred grams (phgm) of monomer, preferably 0.33-1 mM phgm.

When both a dialkyl magnesium (R$_2$Mg) and trialkyl aluminum (R$_3$AL) compound are employed in the catalyst system, the mole ratio of R$_2$Mg:R$_3$Al ranges from 0.01:1.0 to 1.0:0.01, preferably from 0.4:1.0 to 1.0:0.4. However, when ratios of these alkyl metal compounds are not within these ratios, it can be possibly considered that one component is an incidental impurity and thus the catalyst combination of these compositions are considered to be within the scope of the present invention.

The millimole ratio of the total amount of lithium, magnesium and aluminum compounds to the weight of the monomers which are employed in the preparation of the (co)polymers of the present invention range from about 0.2 millimoles to about 100 millimoles per one-hundred grams of monomer, dependent upon the number average molecular weight (Mn) desired for the polymer. This monomer weight is the weight of the 1,3-diene monomer employed when homopolymers are produced and is the total weight of the comonomers, that is, the 1,3-diene monomers and the copolymerizable monomers when copolymers are produced.

The mole ratio of the phosphine oxide modifier to anionic initiator based on lithium used in the polymerization system can vary from 0.05:1.0 to 100.0:1, preferably from 0.1:1 to 5:1.

The amount of phosphine oxide modifier, the amount of R$_2$Mg and/or R$_3$Al, as well as the amount of anionic initiator can be varied to control the 1,2-microstructure in the 1,3-diene (co)polymer produced by the present invention. It has been determined that the 1,3-diene (co)polymers produced according to the process of this invention can be preferably controlled to have a vinyl content ranging between about twenty (20) to about sixty-five (65) percent 1,2-microstructure in the 1,3-diene monomer contributed units.

All amounts of phosphine oxide modifiers, amounts of $R_2Mg$ and/or $R_3Al$, as well as amounts of anionic initiator which are disclosed herein as applicable to the present invention are considered to be catalytically effective amounts, that is, effective amounts for initiating and conducting polymerization of the monomer systems disclosed herein.

Process conditions such as the starting temperature of the polymerization reaction and the ratio of monomer to diluent independently effect the final 1,2-microstructure content of the 1,3-diene (co)polymers. These conditions can be controlled for each monomer reaction system to produce the final desired 1,2-microstructure content of about twenty (20) to about sixty-five (65) percent. It is desirable to produce (co)polymers having a 1,2-microstructure between 35 and 55 percent in the 1,3-diene monomer contributed units.

The term 1,2-microstructure as used in the present invention actually refers to the mode of addition of a growing polymer chain with a conjugated diene monomer unit. Either 1,2-addition or 1,4-addition can occur. In terms of nomenclature this results in 1,2-microstructure for the monomer unit in the polymer chain when 1,3-butadiene is the monomer. When isoprene is the monomer, 3,4-microstructure most generally results with a smaller amount of 1,2-microstructure in the polymer chain. Naming of the polymer structure which results from 1,2-addition is thus dependent on the monomer being polymerized. For simplicity, the term 1,2-microstructure is employed to describe the microstructure which results from 1,2-addition of conjugated dienes.

The polymerization of 1,3-diene monomer in the aforementioned system is preferably effected adiabatically with an increase in temperature occurring during the course of the reaction. As used in this connection the term adiabatic polymerization means that heat is neither supplied or removed during the course of polymerization.

The temperatures employed are those normally employed in solution polymerization techniques. Thus, any temperature which gives a convenient polymerization rate is usually acceptable. However, since it is necessary to use a greater level of the phosphine oxide modifier to maintain the same level of vinyl content with increasing reaction temperatures, initiation temperatures of between about 0° C. to about 110° C. are preferred. If the operation is to be conducted as a batch operation, initiation temperatures of about 30° C. to 70° C. are preferred. If the operation is to be a continuous operation, higher initiation temperatures are employed and it is preferred that the polymerization process be maintained in a range of from 90° C. to 160° C., most preferably 95° C. to 130° C. The polymerization reaction can be performed at pressures between 0.5 to 100 atmospheres. When the desired degree of polymerization has been reached, the (co)polymer can be isolated by precipitation with a non-solvent such as methanol, isopropanol or water. Alternatively, the solution can be injected into the slurry tank containing a hot non-solvent whereupon the solvent is flashed off and the (co)polymer remains as a slurry with the non-solvent. Alternatively, the solvent can be removed directly by the application of heat and/or flashing to a lower pressure.

It is desirable for economic purposes to conduct the present polymerization process at a polymerization rate having at least a 90 percent conversion of monomer to polymer.

The mean average molecular weight of the final (co)polymers produced from the process of the present invention can range from 1,000 to 500,000. These (co)polymers depending on their molecular weight and composition can be used for a variety of applications ranging from molding materials, rubber goods such as tires, and various adhesive applications.

It is believed that one skilled in the art can, using the preceding description, utilize the present invention to its fullest extent. The following preferred specific embodiments are, therefore, to be construed as merely illustrative of the catalyst system and the polymerization process of the present invention. In all of the following examples, approximately a five to ten percent solution by weight of 1,3-butadiene monomer in hexane is the initial charge in the reactor to control the temperature of the exothermic polymerization reaction.

EXAMPLE I

A one gallon stainless steel reactor equipped with a stirrer blade is charged with 198 grams of 1,3-butadiene in 2,000 grams of n-hexane. Thereinafter 2.9 millimoles of tripiperidine phosphine oxide, hereinafter TPPO, is added to the mixture and the temperature is adjusted to 100° C. One millimole total of n-dibutylmagnesium (n-Bu$_2$-Mg) and triethylaluminum (Et$_3$Al) in a ratio of n-Bu$_2$Mg to Et$_3$Al of 0.6 to 1.0 along with 1.9 millimoles of n-butyllithium is added to the mixture in the reaction vessel. Polymerization is completed within 30 minutes with the maximum reaction temperature reaching 132° C. After termination of the reaction, 0.5 percent by weight of an antioxidant, di-tert-butyl-p-cresol ("IONOL"), based on the butadiene is added to the mixture which is coagulated in isopropanol and drum dried to remove the solids. The product polybutadiene represents a 95.5 percent conversion of monomer to polymer and contains 43 percent of 1,2-microstructure as determined by IR spectroscopy. Reaction conditions and polymer properties are illustrated in Table 1.

EXAMPLES 2 THROUGH 11

All of the following examples were conducted in accordance with the procedures of Example 1. The reaction conditions and polymer properties are illustrated in Table 1. All examples utilized between 5.0 and 10.0 parts by weight of 1,3-butadiene monomer in 2,000 grams of hexane as an initial charge.

Examples 2 through 4 utilized a catalyst system of n-butyllithium, TPPO, n-dibutylmagnesium and triethylaluminum at an initial polymerization temperature in a range of 100° C. to 115° C. to produce a polybutadiene polymer having at least 44 percent 1,2-microstructure.

Examples 5 through 7 utilized TPPO, n-butyllithium and triisobutyl aluminum, but no R$_2$Mg compound in the catalyst system. Decreased polymer conversion using this catalyst system could be attributable to the steric hindrance of triisobutyl aluminum.

Examples 8 through 11 utilized no R$_3$Al compound in the catalyst system instead employing only TPPO, lithium-tert-butoxide and (n-butyl, s-butyl)magnesium. The conversion rate from monomer to polymer ranged from 90 to 95 percent and the polybutadiene product polymer had a 1,2-microstructure ranging from 42.9 to 46 percent.

EXAMPLES 12 THROUGH 19

All of the following examples were conducted in accordance with the procedures of Example 1. The reaction conditions and polymer properties are illustrated in Table 2. All examples utilized between 4.8 and 5.0 parts by weight of 1,3-butadiene monomer in 2,000 grams of hexane as an initial charge.

("IONOL"), based on the weight of the initial monomers is added to the mixture which is coagulated in isopropanol and drum dried to remove the solids. The product butadiene-styrene copolymer represents a 92.0 percent conversion of monomer to polymer and contains 44.2 percent of 1,2-microstructure and 19.2 percent of styrene as determined by IR spectroscopy.

From the foregoing description, one skilled in the art

TABLE 1

| | | Reaction Condition | | | | | | Polymer Properties | |
|---|---|---|---|---|---|---|---|---|---|
| Example No. | 1,3-Butadiene[1] Parts by Weight (Grams) | Anionic Initiator (Millimoles) | TPPO[3] (millimoles) | $R_2Mg$ (millimoles) | $R_3Al$ (millimoles) | $T_i$ °C. | $T_f$ °C. | Percent Conversion to Polymer | Percent of 1,2-microstructure |
| 1 | 9.9 (198) | 1.9[2] | 2.9 | 0.375[4] | 0.625[5] | 100 | 132 | 95.3 | 43 |
| 2 | 9.9 (198) | 3.2[2] | 3.7 | 0.375[4] | 0.625[5] | 100 | 132 | 92 | 45 |
| 3 | 5.0 (100) | 3.2[2] | 3.7 | 0.375[4] | 0.625[5] | 115 | 128 | 98 | 45 |
| 4 | 5.0 (100) | 3.2[2] | 3.7 | 0.375[4] | 0.625[5] | 114 | 128 | 91 | 44 |
| 5 | 9.9 (198) | 4.5[2] | 7.0 | — | 3.0[6] | 93 | 96 | 10 | 44 |
| 6 | 9.9 (198) | 7.0[2] | 7.0 | — | 3.0[6] | 93 | 132 | 91 | 46 |
| 7 | 9.9 (198) | 7.0[2] | 7.0 | — | 3.0[6] | 93 | 132 | 89 | 45 |
| 8 | 5.0 (100) | 1.0[7] | 2.0 | 1.0[8] | — | 115 | 120 | 90 | 45.6 |
| 9 | 5.0 (100) | 3.0[7] | 3.0 | 2.0[8] | — | 114 | 116 | 95 | 42.9 |
| 10 | 9.6 (192) | 4.0[7] | 1.0 | 2.0[8] | — | 115 | 130 | 95.5 | 43 |
| 11 | 9.6 (192) | 4.0 | 3.0 | 2.0[8] | — | 115 | 139 | 92 | 46 |

[1]In 2000 grams of hexane
[2]n-Butyl lithium
[3]Tripiperidine phosphine oxide
[4]n-Dibutylmagnesium
[5]Triethylaluminum
[6]Triisobutyl aluminum
[7]Lithium-tert-butoxide
[8](n-, sec-)Dibutylmagnesium

TABLE 2

| | | Reaction Condition | | | | | Polymer Properties | |
|---|---|---|---|---|---|---|---|---|
| Example No. | 1,3-Butadiene[9] Parts by Weight (Grams) | Anionic[10] Initiator (millimoles) | TPPO | $R_2MG$[11] | $T_i$ °C. | $T_f$ °C. | Percent Conversion to Polymer | Percent 1,2-microstructure |
| 12 | 4.8 (96) | 1.0 | 1.0 | 1.0 | 115 | 115 | 92.5 | 40 |
| 13 | 4.8 (96) | 1.0 | 2.0 | 1.0 | 115 | 126 | 95 | 45 |
| 14 | 5.0 (100) | 3.0 | 5.0 | 2.0 | 115 | 128 | 91.5 | 45 |
| 15 | 5.0 (100) | 2.0 | 5.0 | 3.0 | 115 | 123 | 93 | 45 |
| 16 | 5.0 (100) | 1.0 | 2.0 | 1.0 | 115 | 122 | 90 | 46 |
| 17 | 5.0 (100) | 1.0 | 0.5 | — | 115 | 130 | 90 | 42.9 |
| 18 | 5.0 (100) | 1.0 | 0.4 | — | 115 | 130 | 95 | 37.5 |
| 19 | 5.0 (100) | 1.0 | 0.3 | — | 115 | 130 | 95 | 25.6 |

[9]In 2000 grams of hexane
[10]n-Butyl lithium
[11](n-, sec-)Dibutyl magnesium

Examples 12 through 16 utilized as a catalyst system n-butyllithium, TPPO and (n-butyl, sec-butyl) magnesium. The conversion rate from monomer to polymer ranged from 90 to 95 percent and the polybutadiene product polymer had a 1,2-microstructure ranging from 40 to 60 percent.

Comparative examples 17 through 19 employed only n-butyllithium and TPPO in the catalyst system in producing a polybutadiene product polymer having a 1,2-microstructure ranging from 25.6 to 42.9 percent.

EXAMPLE 20

A one gallon stainless steel reactor equipped with a stirrer blade is charged with 113 grams of 1,3-butadiene and 23 grams of styrene in 2,000 grams of n-hexane. Thereinafter 0.8 millimoles of tripiperidine phosphine oxide (TPPO) is added to the mixture and the temperature is adjusted to 100° C. 0.5 millimoles of (n-butyl, s-butyl)magnesium along with 0.8 millimoles of n-butyllithium is added to the monomer mixture in the reaction vessel. Polymerization is completed within 30 minutes with the maximum reaction temperature reaching 105° C. After termination of the reaction, 0.5 percent by weight of an antioxidant, di-tert-butyl-p-cresol can easily ascertain the essential characteristics of this invention, and without departing from the spirit and scope thereof, can make various changes and modifications of the invention to adapt it to various usages and conditions.

I claim:

1. A process for the preparation of a homopolymer of a 1,3-diene monomer said homopolymer containing a 1,2-microstructure ranging between about 20 and about 65 percent which process comprises polymerizing said 1,3-diene monomer in an inert non-polar solvent in the presence of a catalytically effective amount of a catalyst system comprising:

(a) at least one anionic initiator based on lithium, said anionic initiator being selected from the group consisting of substituted lithium amines, substituted lithium phosphines, lithium compounds having the formula ROLi wherein R represents a hydrocarbyl radical of 1 to 20 carbon atoms, lithium compounds having the formula R(Li)$_x$ wherein R represents a hydrocarbyl radical of 1 to 20 carbon atoms and x is an integer of 1-4,phenyllithium, naphthyllithium, 4- butylphenyllithium, p-tolyllithium, 4-phenylbutyllithium, 4-butylcyclohexyllithium, 4-cyclohexylbutyllithium, 1,4-dilithiobutane, 1, 10-dilithiodecane, 1,20-dilithioeicosane, 1,4-dilithiobenzene, 1,4-dilithionaphthalene, 9,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, and 4,4′-dilithiobiphenyl, (b) at least one compound selected from the group consisting of a dialkyl magnesium compound and a trialkyl aluminum compound, and (c) a phosphine oxide modifier represented by the structural formula:

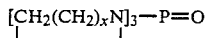

$$[CH_2(CH_2)_xN]_3-P=O$$

wherein x represents an integer of 3, 4 or 5, in which the temperature of polymerization initiation is at least 0° C. and in which the millimoles of the anionic initiator per 100 grams of the 1,3-diene monomer ranges between about 0.2 and about 100, the molar ratio of (b) to (a) ranges between about 0.01/1.0 to about 100/1.0, and the molar ratio of (c) to (a) ranges between about 0.05/1 to about 100.0/1.0.

2. The process as in claim 1, wherein the phosphine oxide modifier is selected from the group consisting of tripiperidine phosphine oxide, tripyrrolidyl phosphine oxide and tri(cyclohexamethylene amine) phosphine oxide.

3. The process as in claim 1 wherein the polymerization temperature is maintained in a temperature range from about 90° C. to about 160° C.

4. The process as in claim 1 wherein the 1,3-diene monomer is butadiene.

5. The process as in claim 1 wherein the homopolymer contains a 1,2-microstructure ranging between 35 and 55 percent.

6. A process for the preparation of a copolymer formed by polymerizing:

(A) 40 to 100 percent of at least one 1,3-diene monomer, and (B) 0 to 60 percent of one or more reactive monomers which are copolymerizable with said 1,3-diene monomers in an inert non-polar solvent in the presence of a catalytically effective amount of a catalyst system comprising:

(a) an anonic initiator based on lithium, said anionic initiator being selected from the group consisting of substituted lithium amines, substituted lithium phosphines, lithium compounds having the formula ROLi wherein R represents a hydrocarbyl radical of 1 to 20 carbon atoms, lithium compounds having the formula R(Li)$_x$ wherein R represents a hydrocarbyl radical of 1 to 20 carbon atoms and x is an integer of 1-4, phenyllithium, naphthyllithium, 4-butylphenyllithium, p-tolyllithium, 4-phenylbutyllithium, 4-butylcycloehxyllithium, 4-cyclohexylbutyllithium, 1,4-dilithiobutane, 1,10-dilithiodecane, 1,20-dilithioeicosane, 1,4-dilithiobenzene, 1,4-dilithionaphthalene, 9,10-dilithioanthracene, 1,2-dilithio-1,2-diphenylethane, 1,3,5-trilithiopentane, 1,5,15-trilithioeicosane, 1,3,5-trilithiocyclohexane, 1,3,5,8-tetralithiodecane, 1,5,10,20-tetralithioeicosane, 1,2,4,6-tetralithiocyclohexane, and 4,4′-dilithiobiphenyl, (b) at least one compound selected from the group consisting of a dialkyl magnesium compound and a trialkyl aluminum compound, and (c) a phosphine oxide modifier represented by the structural formula:

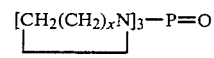

$$[CH_2(CH_2)_xN]_3-P=O$$

wherein x represents an integer of 3, 4, or 5, in which the temperature of polymerization initiation is at least 0° C. and in which the millimoles of the anionic initiator per 100 grams of the (A+B) monomers ranges between about 0.2 and about 100, and the molar ratio of (b) to (a) ranges between about 0.01/1.0 to about 100/1.0, and the molar ratio of (c) to (a) ranges between about 0.05/1.0 to about 100.0/1.0 said copolymer containing a 1,2-microstructure in the 1,3-diene monomer contributed units ranging between about 20 and about 65 percent.

7. The process as in claim 6 wherein the phosphine oxide modifier is selected from the group consisting of tripiperidine phosphine oxide, tripyrrolidyl phosphine oxide, and tri(cyclohexamethylene amine) phosphine oxide.

8. The process as in claim 6 wherein the polymerization temperature is maintained in a range from 90° C. to 160° C.

9. The process as in claim 6 wherein the 1,3-diene is butadiene and the reactive monomer is styrene.

10. The process as recited in claim 3 wherein the percent conversion of monomer to polymer is at least 89%.

11. The process as recited in claim 10 wherein the anionic initiator is selected from the group consisting of R(Li)$_x$ wherein R represents a hydrocarbyl radical of 1 to 20 carbon atoms and x is an integer of 1-4 and ROLi wherein R represents a hydrocarbyl radical of 1 to 20 carbon atoms.

12. The process as recited in claim 11 wherein the molar ratio of (c) to (a) ranges from 0.1:1 to 5:1 and the homopolymer contains from about 35 to about 55% 1,2-microstructure in the 1,3-diene monomer contributed units.

13. The process as recited in claim 12 wherein the 1,3-diene is butadiene, the anionic initiator is selected from the group consisting of n-butyllithium and lithium-tert-butoxide, the constituent (b) is selected from the group consisting of n-dibutylmagnesium, (n-, sec-)dibutylmagnesium, triethylaluminum, triisobutylaluminum, and mixtures thereof, and the phosphine oxide modifier is tripiperidine phosphine oxide.

14. The process as recited in claim 8 wherein the percent conversion to copolymer is at least 90%.

15. The process as recited in claim 14 wherein the anionic initiator is R(Li)$_x$ wherein R represents a hydrocarbyl radical of 1 to 20 carbon atoms and x is an integer of 1 to 4.

16. The process as recited in claim 15 wherein the molar ratio of (c) to (a) ranges from 0.1:1 to 5:1 and the copolymer contains from about 35 to about 55% 1,2microstructure in the 1,3-diene monomer contributed units.

17. The process as recited in claim 16 wherein the 1,3-diene is butadiene, the reactive monomer is styrene, the anionic initiator is n-butyllithium, the constituent (b) is (n-butyl, sec-butyl)magnesium and the phosphine oxide modifier is tripiperidine phosphine oxide.

* * * * *